July 3, 1951  E. T. JAYNES  2,558,758
RADIO VELOCITY INDICATOR
Filed Jan. 22, 1944  2 Sheets-Sheet 2
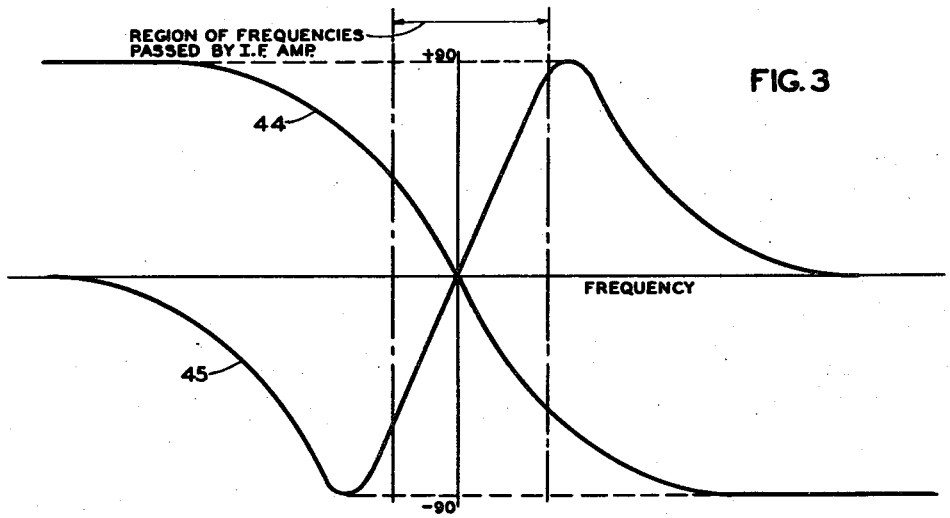
FIG. 3
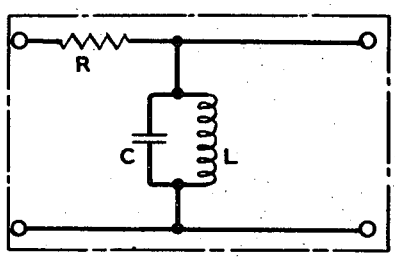
FIG. 5
FIG. 4
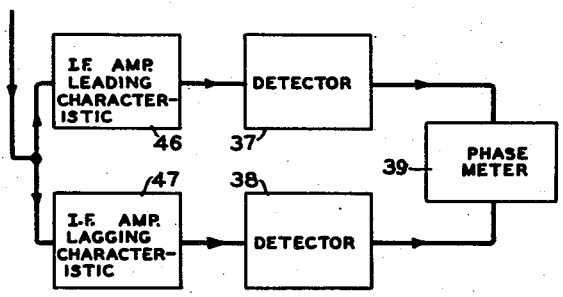
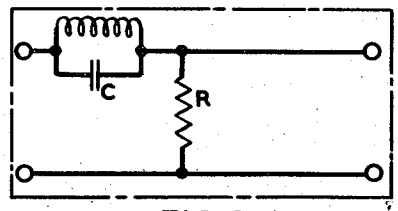
FIG. 6
INVENTOR
EDWIN T. JAYNES
BY Paul B. Hunter
ATTORNEY Patented July 3, 1951

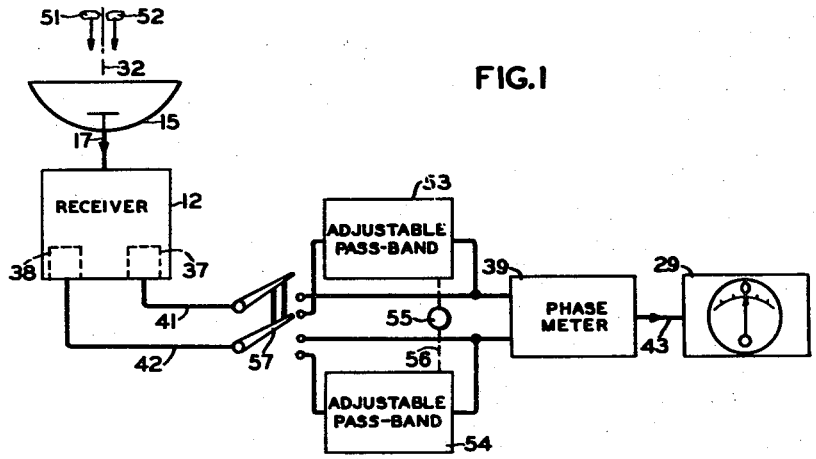
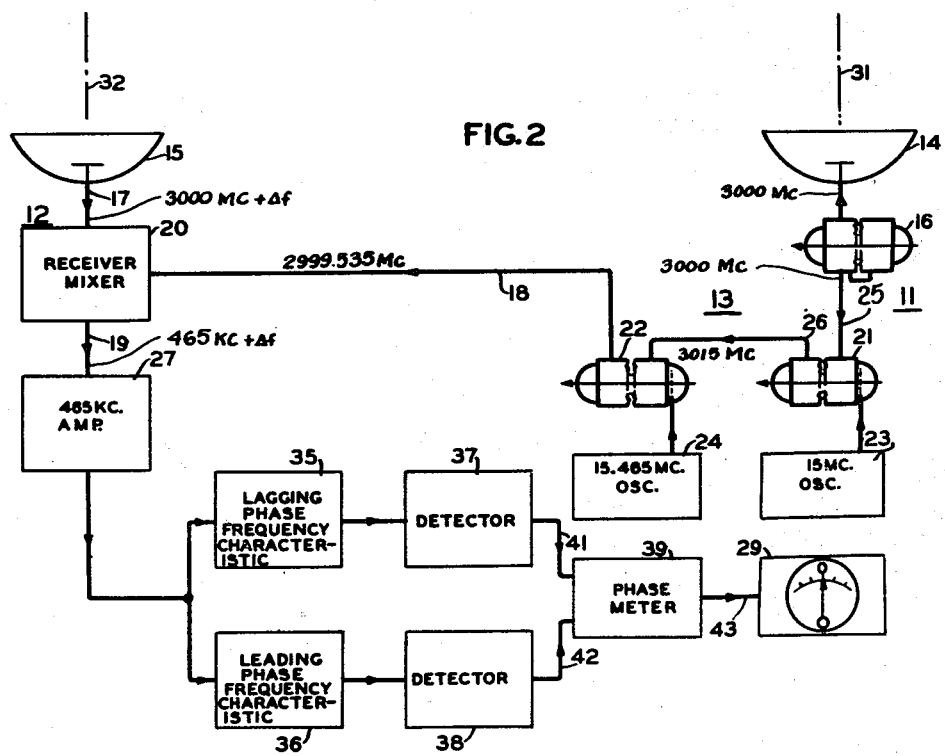

2,558,758

UNITED STATES PATENT OFFICE 2,558,758

RADIO VELOCITY INDICATOR

Edwin T. Jaynes, Garden City, N. Y., assignor to The Sperry Corporation, a corporation of Delaware Application January 22, 1944, Serial No. 519,296

17 Claims. (Cl. 343—8)

My invention relates to methods and apparatus for locating objects.

Radio systems for detecting the movement of distant objects have been devised for utilizing the well known "Doppler effect," or the apparent change of frequency of signal energy transmitted through space between objects between which the distance is varying. Doppler-effect radio detection systems have heretofore employed a radio transmitting oscillator for the dual purposes of transmitting energy toward a distance object to cause energy reflection therefrom toward receiving apparatus including a heterodyne mixer, and supplying energy at the transmitted-energy frequency to a heterodyne mixer in the receiver. So long as the distant object reflecting transmitted energy back to the receiver remained at a constant distance from the radio object detection system, the mixer merely received two input signals of the same frequency, viz., the transmitter frequency, and no heterodyne signal was produced thereby. But if the object approached the detection system, the frequency of the signal received by reflection from the object increased to an extent $\Delta f$ proportional to the rate of decrease of distance between the object and the system; and conversely, if the distance to the object increased, the received signal frequency was accordingly decreased. The output of the mixer was an alternating signal of frequency equal to the Doppler-change value or $\Delta f$, proportional to the rate of change of distance to the object, but not indicating whether the object distance was decreasing or increasing.

An object of the present invention is to provide improved Doppler systems.

Another object of the invention is to provide methods and apparatus for determining whether detected objects are traveling toward or away from an observation or control station, as well as for determining the velocity of such objects.

More particularly it is an object of the invention to provide arrangements for indicating sense as well as magnitude of a Doppler frequency.

A further object of the invention is to provide frequency comparison and frequency conversion systems.

Still another object of the invention is to provide an improved microwave system, and means for detecting a relatively minute frequency shift.

Other and further objects and advantages will become apparent as the description proceeds.

In accordance with a major feature of the present invention, there is applied to the heterodyne mixer of a Doppler moving-object detection system a "local oscillator" signal which is at a frequency different from the transmitted signal frequency, by a difference accurately maintained at a selected value appreciably greater than the largest frequency changes expected to be produced by the rapid movement of detected objects. The frequency difference may be fixed at a value ideally suited for amplification in a tuned intermediate-frequency amplifier arranged to receive the heterodyne output of the mixer. For example, the difference frequency may be a standard I. F. amplifier frequency, such as 465 kilocycles.

As a result, an intermediate-frequency signal is produced by the heterodyne mixer when energy at a frequency nearly equal to the transmitter frequency is received from a distant reflecting object moving toward or away from the detection system, and this signal is combined in the mixer with the "local oscillator" signal. If the "local oscillator" signal frequency is lower than the transmitter frequency by a difference equal to the desired intermediate frequency, an increase of $\Delta f$ in the frequency of the received energy (due to decreasing distance of the reflecting object) then results in an equal increase in the frequency of the signal supplied to the I. F. amplifier by the heterodyne mixer, and a decrease of the received signal frequency results in an equal decrease of frequency of the mixer output signal.

A frequency discriminator may then be employed for indicating the extent and the direction (or sense) of change of frequency of the intermediate-frequency amplifier output signal, and thus for unambiguously indicating not only the absolute value of the rate of change of distance of the object but also the sense of the change, i. e., whether the object distance is increasing or decreasing.

In accordance with the invention in its preferred form, a transmitter is arranged for projecting electromagnetic waves, particularly microwaves, toward a point at which presence of an object is suspected by use of angularly adjustable parabolic reflectors such as are disclosed in Patents Nos. 2,231,929 of J. Lyman and 2,083,242 of W. Runge. A receiver is provided for picking up any reflection of the transmitted waves from an intercepting object which may be moving, the frequency of which waves depends on the velocity of the object due to the Doppler effect, and means are arranged for supplying two fixed frequencies to the receiver, one exactly equal to the transmitted frequency, the other at a fixed frequency difference from the transmitted frequency, the latter to be used as a local-oscillator. The function of the mixer in the receiver is to subtract the above local oscillator frequency from the transmitter frequency, and from the Doppler-shifted reflected wave frequency, thus furnishing the intermediate-frequency amplifier with one strong signal of frequency exactly equal to the difference between the two fixed frequencies supplied to the receiver, and a weak signal which is shifted by the Doppler effect with respect to the frequency of the strong, fixed-frequency signal. By well-known methods these two frequencies may be made to beat with each other, producing a single frequency equal to the original Doppler shift.

It is an object of my invention to provide additional means as by use of suitable frequency responsive network or networks whereby the direction of the frequency shift may be determined, thus giving an indication of whether the reflecting object is approaching the detection system or going away from it. This network or phase comparator is arranged to be energized by the receiver output so as to produce an indication of the speed of the detected object, and an indication whether the distance to the detected object is increasing or decreasing.

A better understanding of the invention will be afforded by the following detailed description considered in conjunction with the accompanying drawing in which:

Fig. 1 is a schematic diagram of a selective speed- and direction-indicating system in accordance with the invention;

Fig. 2 is a schematic diagram of a Doppler object-locating, speed- and direction-indicating system in accordance with the invention;

Fig. 3 is a graph illustrating the principle of operation of the frequency indicator in the apparatus of Fig. 2;

Fig. 4 is a fragmentary diagram of a modification in the arrangement of the apparatus in Fig. 2;

Fig. 5 is a diagram of one type of network which may be employed for producing the lagging characteristic illustrated in Fig. 3; and Fig. 6 is a diagram of a network which may be utilized for producing the leading characteristic illustrated in Fig. 3.

Like reference characters are utilized throughout the drawing to designate like parts.

The system illustrated in Fig. 2 comprises a transmitter 11, a receiver 12, and means 13 for supplying local oscillator frequency to the receiver 12 controlled by the frequency of the transmitter 11.

Preferably separate antennae 14 and 15 are provided for the transmitter 11 and the receiver 12, respectively.

In order to obtain a high degree of directionality, it is advantageous to employ a transmitter frequency in the microwave region such as ten centimeters, for example. With such short wave lengths the antennae 14 and 15 may take the form of conventional paraboloid reflectors containing dipoles. By way of illustration, the transmitted signal frequency is taken as 3000.000 megacycles. As will later become apparent, however, this frequency may change appreciably without detrimental effect.

The transmitter 11 may comprise an oscillator 16 of the velocity modulated type, for example. If desired the oscillator 16 may be a vacuum tube of a type employing cavity resonators having an electron beam passing therethrough to effect velocity modulation and subsequent density modulation and energy extraction from the beam oscillators and amplifiers are described in "Basic Radio" by J. Barton Hoag, published in 1942, Fig. 38L, page 329, section 38.5. Such tubes are also disclosed in Patent No. 2,281,935 to Hansen et al., and the principle of operation is described in an article by W. C. Hahn and G. H. Metcalf, on pages 106 to 116, in the February 1939 issue of Proceedings of the Institute of Radio Engineers.

For simplicity the oscillator 16 is shown as directly coupled to the antenna 14, but it will be understood that except for very low-power installations it may be preferable to employ the oscillator 16 as a driver and interpose a power amplifier between the oscillator 16 and the antenna 14.

The receiver 12 may be of conventional superheterodyne type suitably arranged for the reception of microwaves. Such superheterodyne receivers may include a radio-frequency stage and one or more mixers for heterodyning a received wave with local oscillator output to produce an intermediate frequency output. In the diagram the radio-frequency stage and mixer are represented by a box 20, the input signal and local oscillator inputs are supplied over lines 17 and 18, respectively, and the intermediate frequency output is fed over a line 19.

The interconnecting apparatus 13 is interposed between the oscillator 16 and the local oscillator input connection 18 of the receiver 12 instead of providing an independent local oscillator, in order that the local oscillator signal frequency will exactly follow any unavoidable variations in the transmitter frequency. In order that an intermediate frequency may be produced which is within a band conveniently amplified and handled in subsequent stages of the receiver 12, the apparatus 13 is arranged to produce the required frequency shift. As illustrated the frequency shifting apparatus 13 comprises a pair of modulation amplifiers 21 and 22 in cascade, having associated therewith constant frequency oscillators 23 and 24, respectively, for modulating the waves supplied to the modulation amplifiers 21 and 22. As represented by the line 25 the first modulation amplifier 21 is arranged to be driven by the output of the oscillator 16, and as represented by the line 26, the second modulation amplifier 22 is arranged to be driven by the output of the first modulation amplifier 21. As will be apparent to those skilled in the art, the oscillator 16 may be arranged to supply an output at the same frequency both to the connection 25 and to the antenna 14 (or to an interposed power amplifier which is not shown).

Where microwave energy is employed the modulation amplifiers 21 and 22 may also be of the velocity modulated type, preferably of the same type as the oscillator 16, it being understood that the same type of tube may be arranged as either an oscillator or amplifier according to the connections.

The modulation source 23 is a relatively high frequency oscillator, for example, a crystal oscillator, and it may be arranged to modulate the amplifier 21 by controlling the grid voltage thereof to produce amplitude modulation. Various ways of producing amplitude modulation are described in the previously mentioned Patent No. 2,281,935.

The oscillator 24 may be similar to the oscillator 23 and similarly arranged except that its frequency differs from the frequency of the oscillator 23 by the number of cycles desired as intermediate frequency output through the channel 19 of the receiver 12. For example, oscillator 23 may be designed for a 15 megacycle output and oscillator 24 may be designed for a 15.465 megacycle output where a 465 kilocycle intermediate frequency is to be employed in the receiver 12.

With oscillator 16 operating at 3000 megacycles and oscillator 23 arranged to modulate amplifier 21 at 15 megacycles, the output resonator of amplier 21 is tuned to select a particular sideband frequency, e. g., it may be tuned to 3015 megacycles. By virtue of the high Q of the output resonator, and the relatively wide frequency separation of the carrier and sideband frequencies, the output resonator enhances the amplifier output at the selected frequency, and suppresses the 3000-megacycle and 2985-megacycle amplifier output components. The input resonator of amplifier 22 is also tuned to the selected sideband frequency, 3015 megacycles, and the output resonator of amplifier 22 is tuned to the lower sideband produced by modulation of the 3015-megacycle signal by the 15.465-megacycle output of oscillator 24. Thus, the output resonator of amplifier 22 suppresses the 3015-megacycle and 3030.465-megacycle output components, and selects the 2999.535-megacycle components for transmission to the mixer 20.

It will be readily apparent that if the 2999.535-megacycle output signal component were produced in amplifier 21 directly by modulation at 465 kilocycles, an extremely sharp frequency-responsive apparatus would be required to discriminate appreciably against the 3000-megacycle and 3000.465-megacycle output components of amplifier 21; for example, a resonator having a Q of the order of 100,000 to 1,000,000 would be necessary. Moreover, the frequency of oscillator 16 would then have to be maintained extremely stable, in order that the selected sideband frequency of amplifier 21 be made to remain within the narrow resonance range of the output resonator. Thus, according to an important feature of the present invention, two relatively large frequency conversions are made in opposite senses from a base frequency, i. e., from the transmitted energy frequency, these frequency conversions being made sufficiently extensive for adequate discrimination against the undesired frequency components, and the relatively small difference of extents of the opposite frequency conversions being made equal to the desired extent of the ultimate or net frequency conversion.

Preferably an intermediate frequency amplifier 27 is provided for introducing adequate gain for the intermediate frequency output supplied through line 19 by the receiver superheterodyne mixer 20.

For producing indications of variations in the frequency of the output from the intermediate frequency amplifier 27, a suitable frequency-responsive device is provided having a suitable indicating device such as a galvanometer 29 connected to the output thereof.

It will be understood that the antennae of the paraboloid type such as 14 and 15 are highly directive in their action, both of these antennae being angularly adjustable to locate a target or object. Consequently when the oscillator 11 is energized a beam 31 of microwave energy will be directed along the axis of the antenna 14. In the event the beam 31 is intercepted by a moving object, a reflected beam 32 will be directed into the receiver antenna 15, the angular position of which will determine the azimuth and elevation angles of the object. It will be understood that in practice the distance to the reflected object is so great that the antennae 14 and 15 are aimed along substantially parallel directions. Owing to the fact that the intercepting or detected object is assumed to be in motion, a change in frequency of the reflected beam 32 will be produced, known as the "Doppler" frequency change, the received signal frequency being higher than the transmission frequency by a Doppler frequency change of $\Delta f$ in case the object is traveling toward the observation station, and being lower if the object is moving away from the observation station, in which the apparatus of Fig. 2 is installed.

With the assumed values of frequencies, a ten-centimeter (3000-megacycle) wave will travel along the line 25 and, being modulated by the 15-megacycle output of the oscillator 23 in modulation amplifier 21, will produce a pair of sidebands, one of which is at a frequency of 2985 megacycles and the other of which is at 3015 megacycles. The output resonator of modulation amplifier 21 is tuned to a selected one of these sidebands, e. g., to the 3015-megacycle sideband. This sideband output of modulation amplifier 21 drives modulation amplifier 22, which is in turn modulated at 15.465 megacycles to produce a further pair of sidebands, the selected one of which has a frequency of 2999.535 megacycles.

If the intercepting or detected object is stationary, a 3000 megacycle wave will be received through channel 17, and heterodyning with the 2999.535-megacycle local oscillator signal frequency in mixer 20, will produce a signal at an intermediate frequency of 465 kilocycles. Owing to the unavoidable direct leakage from the transmitter antenna 14 to the receiver antenna 15, a relatively strong component at this frequency will be produced in any event in the amplifier 27.

With the detected or beam-intercepting object in such motion that its distance from the observation station is varying, the received signal frequency will be shifted by $\Delta f$ to a frequency of 3000 megacycles $+\Delta f$, where $\Delta f$ represents a Doppler-effect frequency change which is positive or negative according to whether the distance to the object is decreasing or increasing, the magnitude of $\Delta f$ being proportional to the rate of change of distance of the object from the observation station. Due to the Doppler effect, a heterodyne output component through the channel 19 will therefore have a frequency equalling 465 kilocycles plus the Doppler frequency change, or 465 kilocycles $+\Delta f$.

Thus, when antennae 14 and 15 are aimed at a moving object, the intermediate-frequency amplifier 27 will pass components at two frequencies, a relatively strong 465-kilocycle component which may be called the intermediate-frequency carrier, due to direct microwave energy leakage, e. g., energy transfer across the space between antenna 14 and antenna 15, and a weaker signal having a frequency different from 465 kilocycles by $\Delta f$, due to the Doppler effect.

In accordance with a feature of the present invention, electrical apparatus is provided for indicating the magnitude and sign (or sense) of $\Delta f$. Such apparatus may comprise a frequency-responsive apparatus for indicating the sense and extent of frequency deviations from 465 kilocycles of the I. F. amplifier output component due to energy reflected to the receiving antenna from a distant object. For example, a pair of frequency responsive or sensitive networks 35 and 36 may be provided, one of these networks producing the reverse phase shift from the other in response to frequency changes, and hence may be termed respectively lagging phase-frequency characteristic and leading phase-frequency characteristic The pair of frequency-responsive networks 35 and 36 have different phase characteristics, for example, one producing greater leading or lagging effect in response to frequency variation than the other. Preferably, the networks 35 and 36 have opposite phase-frequency characteristics, one producing greater lead and the other producing greater lag with increase in frequency. Each of the networks or transmission channels 35 and 36 receives both the stronger signal component at 465 kilocycles and the weaker signal component at 465 kilocycles $+\Delta f$. Due to the difference of phase-shift characteristics of the two channels, the phase displacement of the component at 465 kilocycles $+\Delta f$ from the 465-kilocycle component at the output of one channel is different from the corresponding phase displacement between the two components at the output of the other channel, by an extent substantially proportional to $\Delta f$. By comparing the relative phase shifts of the two channels, the Doppler frequency change $\Delta f$ may be determined. In order to convert the intermediate-frequency to an audio frequency, in which the phase relationship may more readily be observed or measured, a pair of detectors 37 and 38 may be connected to the outputs of the networks 35 and 36, respectively. Each of these detectors receives the 465-kilocycle frequency component and the component at 465 kilocycles $+\Delta f$, and provides an audio output signal at a frequency equal to the difference between the component frequencies, or $\Delta f$. The phase of the audio output of each detector is dependent upon the relative phase shift between the two intermediate-frequency components at the output of the channel through which the detector is supplied. Thus, the phase of the output of one detector leads or lags behind that of the other detector according to whether $\Delta f$ is positive or negative, and to an extent dependent upon the magnitude of $\Delta f$, and thus dependent upon the rate of change of distance to the detected object.

A phase meter 39 may be provided, which is designed for operation at audio frequencies and has input connections 41 and 42 from the detectors 37 and 38 with an output connection 43 to the indicator 29, which preferably, is a zero-center meter. In this case the phase meter 39 may be a conventional vacuum tube or rectifier circuit of the type conventionally known as a phase-sensitive amplifier or phase-sensitive rectifier, an example of which is described in the copending application of Gifford E. White, Serial No. 478,807, filed March 11, 1943, or illustrated in Fig. 6 of Patent No. 2,042,831, Crosby.

As illustrated in Fig. 3 the networks 35 and 36 are designed to produce a maximum slope of phase-frequency characteristic at 465 kilocycles. The graph of Fig. 3 is drawn with frequency measured along the horizontal axis and lagging phase angle measured downward along the vertical axis, leading phase angle being measured upward along the vertical axis. The phase angle of the output of the lagging network 35 is represented by the curve 44, indicating that the output lags the input by an amount that increases with frequency. The inverse or opposite characteristic of the leading network 36 is represented by the curve 45.

Suitable circuits for the phase-shifting networks are shown in Figures 5 and 6. In Fig. 5 a resistance R is connected in series with the line and a parallel-resonant circuit LC is connected across it. The inductance L and the capacitance C are of such values that they resonate at the center frequency of the intermediate-frequency amplifier, which is 465 kc. in the case being considered here. This circuit results in the phase-frequency characteristic 44 of Fig. 3. Fig. 6 represents a network in which the phase lead increases with frequency over a restricted range of frequencies, which is made to coincide with the frequency range passed by the intermediate-frequency amplifier. To accomplish this, one need only interchange the resistance and the parallel-resonant circuit used in the network of Fig. 5. This results in the phase-frequency characteristic 45 of Fig. 3, in which the phase lead increases with frequency. The "Q" of the parallel resonant circuits may be such that the shunt impedance built up at resonance is roughly equal to the resistance R.

Although in Fig. 2 separate phase-varying networks 35 and 36 are shown, it will be understood that the invention is not limited to this precise arrangement. If desired, for example, a pair of separate intermediate-frequency amplifiers 46 and 47 may be employed, as in Fig. 4, which are so designed as to have different or opposite phase-varying frequency-responsive characteristics.

As described in connection with Fig. 2, if any variation takes place in the velocity of the detected objects toward or away from the observation station, there is a variation in the Doppler frequency. If the local oscillator means 13 is designed to produce a frequency output equalling the frequency corresponding to ten centimeters less the desired intermediate frequency of 465 kilocycles, the input to the intermediate frequency amplifier 27 due to the received signal will be 465 kilocycles plus the Doppler frequency. The input due to the unavoidable leakage from the transmitter 11, will be 465 kilocycles. Thus, both networks 35 and 36 will pass two frequencies, namely 465 kilocycles and 465 kilocycles plus the Doppler frequency. The 465-kilocycle-plus-Doppler frequency will be phase shifted in opposite directions relative to the 465 kc. carrier in the networks 35 and 36. After demodulation by the detectors 37 and 38, only the audio frequencies equal to the Doppler frequency will appear in the input connections 41 and 42, but their phase relationship will depend on the phase shifts that occurred in networks 35 and 36, and thus on the speed and direction of motion of the target. Accordingly the phase meter 39 will be responsive to the speed of the detected objects and the polarity of the output to the connection 43 will depend upon whether the object is moving toward or away from the observation station.

It may be further noted that in case there are several reflecting objects in the beam 31, and if the distances to the different objects are changing at different rates, the signals resulting from movement of one object may be separated from signals due to another object by frequency-sensitive networks inserted in lines 41 and 42 so that only one frequency at a time is passed to the phase meter. If the phase shifts are the same in the two frequency sensitive networks the operation of the phase meter will be exactly as before, except that one may, by adjusting the frequency-sensitive networks, separate the various signals, and determine whether the distance to each selected object is decreasing or increasing. For example, as illustrated in Fig. 1, if two moving objects 51 and 52 traveling at unequal speeds come within the beam 31 and reflect waves to the receiver 12 along its beam path 32, two object-reflected signals characterized by different values of $\Delta f$ are produced, giving rise to two different audio frequency outputs or Doppler notes from each of the detectors 37 and 38 of receiver 12 of Fig. 2. For selecting one of these Doppler notes a pair of adjustable pass-band filters 53 and 54 of identical design may be provided having a common pass-frequency-adjusting knob 55 secured to a common shaft 56 connected to internal mechanism (not shown) for selecting the pass bands of the two networks 53 and 54. A schematically indicated double-throw changeover switch 57 may be provided for either interposing the filter-networks 53 and 54 in the lines 41 and 42 respectively, or connecting the detectors 37 and 38 directly to the phase-meter 39 as in Fig. 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a continuous-wave transmitter, a continuous-wave receiver of the superheterodyne type designed for a predetermined intermediate frequency, said receiver having a local-oscillator input channel and a signal input channel, means for projecting electromagnetic energy from the continuous wave transmitter, means for receiving reflections of such energy and supplying them to the signal input channel of the receiver, means for supplying local oscillator energy to the local oscillator channel of the receiver from the transmitter, means for shifting the transmitter frequency supplied to said local oscillator channel by the amount of the intermediate frequency for which the superheterodyne receiver is designed, and means responsive to the intermediate frequency output to indicate the sense and the magnitude of deviation of frequency of the reflected signal from the frequency of the projected electromagnetic energy.

2. In an object locating system in combination, a directive radio transmitter, a directive receiver, said receiver having a local oscillator with a frequency equaling the difference between the transmitter frequency and a desired intermediate frequency, a pair of frequency responsive networks with differing phase characteristics supplied from said receiver, detectors for demodulating the outputs of said networks, and a speed-indicating phase meter supplied from said detectors for comparing the audio phase relationship of the detector outputs.

3. An object locating system comprising means for transmitting energy of a base frequency toward a distant object, a heterodyne mixer connected to receive energy reflected from said object and arranged to receive additional energy directly from said transmitting means, frequency converter means included in the connection between said transmitting means and said mixer for supplying to said mixer a local oscillator signal at a predetermined intermediate-frequency difference from said base frequency, intermediate-frequency amplifier means coupled to said mixer for receiving therefrom and amplifying a first intermediate-frequency output signal of a reference frequency equal to said predetermined difference between the base signal frequency and the local oscillator signal frequency and a further intermediate-frequency output signal of frequency shifted from said reference frequency in a sense and to an extent dependent upon the rate of change of distance of said remote object, and means coupled to the output of said amplifier comparing the frequency of said further output signal with said reference signal frequency for providing an unambiguous measure of the rate of change of distance of said distant object.

4. Apparatus as defined in claim 3, wherein said frequency converter means comprises cascade-connected first and second frequency conversion devices characterized by two opposite frequency conversions different in extent by said predetermined difference, said first frequency conversion device characterized by a conversion from said base signal frequency and said second frequency conversion device connected to receive the output of said first conversion device and characterized by a second frequency conversion to said output signal, each of said frequency conversion devices characterized by a frequency conversion of an extent greater than said predetermined difference between the output signal frequency and said reference signal frequency.

5. Apparatus as defined in claim 3, wherein said frequency comparing means comprises first and second means for differentially phase shifting one of said intermediate-frequency output signals relative to the other in a sense and to an extent dependent upon the relative frequencies of said signals, first and second detector means coupled respectively to said first and second phase shifting means for producing output voltages of a frequency equal to the difference of the frequencies of said two signals and of relative phase dependent upon the differential phase shift of said two signals, and means coupled to said detector means for indicating the extent and sense of phase separation of said output voltages.

6. An object locating system, comprising means connected to receive a reference signal of substantially constant frequency and a further signal of frequency varying above or below the frequency of said reference signal according to the sense and rate of change of distance between said receiver and a distant object, first and second means connected to said means for differentially phase shifting one of said signals relative to the other in a sense and to an extent dependent upon the relative frequencies of said signals, first and second detector means coupled respectively to said first and second phase-shifting means for producing output voltages of frequency equal to the difference between the frequencies of said two signals and of relative phase dependent upon the differential phase shift of said two signals, first and second adjustable pass-band filters coupled to said first and second detector means for selecting detector output voltages within a predetermined frequency range and rejecting other detector output voltages, said first and second filters being adjustable for providing equal phase-frequency characteristics for voltages of a frequency within the pass band of said filters, and means coupled to said first and second bandpass filters for indicating the extent and the sense of phase separation of said output voltages, thereby indicating the rate and sense of change of distance of a remote object.

7. Apparatus for providing a measure of the difference between the frequency of one signal and the frequency of a reference signal, comprising first and second signal channels each receiving said one signal and said reference signal, said first channel being characterized by a different relative phase shift between said signals than the relative phase shift between them in said second channel, the extent of the relative phase shift being dependent upon the difference between the frequencies of said signals, first and second detector means being connected to receive the outputs of said first and second signal channels, respectively, for producing first and second output voltages of a frequency equal to the difference of the frequencies of said signals, the relative phases of said first and second output voltages being dependent upon the difference of relative phase shifts between said signals, and means coupled to said first and second detector means for providing a measure of the phase difference of said first and second voltages.

8. Apparatus for determining the relative frequencies of two alternating signals, comprising first and second means for differentially phase shifting one of said signals relative to the other in sense and to an extent dependent upon the relative frequencies of said signals, first and second detector means coupled to said first and second phase-shifting means, respectively, for producing output voltages of a frequency equal to the difference between the frequencies of said two signals and of relative phase dependent upon the differential phase shift of said two signals, and means coupled to said detector means for indicating the extent and sense of phase separation of said output voltages.

9. Apparatus for producing an output signal with a frequency of a very small predetermined difference from the frequency of a base signal, comprising first means connected to receive said base signal for producing an intermediate signal of frequency different from said base signal frequency by an extent of greater order of magnitude than said small predetermined difference and of lesser order of magnitude than said base signal frequency, and second means connected to said first means to receive said intermediate signal for producing a frequency conversion of the order of magnitude of the frequency conversion in said first means and in the opposite sense.

10. Apparatus for producing an output signal with a frequency of a very small predetermined difference from the frequency of a base signal, comprising a first frequency converter means connected to receive said base signal for producing an intermediate signal of frequency different from said base signal frequency by an extent of greater order of magnitude than said small predetermined difference and of lesser order of magnitude than said base signal frequency, and a second frequency converter means connected to said first converter to receive said intermediate signal for providing a frequency conversion of the order of magnitude of the frequency conversion in said first frequency converter and in the opposite sense, the difference of extents of the first and second frequency conversions being equal to said predetermined difference.

11. Apparatus for producing an output signal with a frequency of a very small predetermined difference from the frequency of a base signal, comprising a first frequency converter for receiving said base signal, said first converter having an output signal of frequency different from said base signal frequency by an extent of greater order of magnitude than said small predetermined difference and of lesser order of magnitude than said base signal frequency, and a second frequency converter connected to said first converter to receive said output signal, said second converter being characterized by a frequency conversion of the order of magnitude of the frequency conversion in said first frequency converter and in the opposite sense, the difference of extents of the first and second frequency conversions being equal to said predetermined difference, and at least one of said frequency conversion devices including frequency-selective means for selecting a desired conversion component frequency and rejecting components with frequencies different therefrom by the order of magnitude of said frequency conversions.

12. Apparatus as in claim 11 wherein there is provided a transmitter for irradiating a moving object with said base signal, whereby said base signal is Doppler shifted in frequency; a receiver having a third frequency converter for receiving said Doppler shifted frequency, a portion of said base signal, and the output of said second converter; the output of said third converter being characterized by a signal having the frequency of said small predetermined difference and a signal having a frequency differing therefrom by an extent substantially equal to the Doppler frequency, and means for indicating the frequency difference of the output of said third converter.

13. In an object locating system in combination, means for producing a reference signal of substantially constant frequency and a further signal of frequency varying above or below the frequency of said reference signal according to the sense and rate of change of distance between said receiver and a distant object, means connected to the above means for differentially phase shifting one of said signals relative to the other in a sense and to an extent dependent upon the relative frequencies of said signals, first and second detector means coupled to said phase shifting means for producing output voltages of frequency equal to the difference between the frequencies of said two signals and of relative phase dependent upon the differential phase shift of said two signals, first and second adjustable pass-band filters coupled to said first and second detector means for selecting detector output voltages within a predetermined frequency range and rejecting other detector output voltages, said first and second filters being adjustable for providing equal phase-frequency characteristics for voltages of a frequency within the pass band of said filters, and means coupled to said first and second band-pass filters for indicating the extent and the sense of phase separation of said output voltages, thereby indicating the rate and sense of change of distance of a remote object.

14. An object locating system, comprising means for transmitting energy of a base frequency toward a distant object, means for receiving energy reflected from said object, said receiving means including a heterodyne mixer connected to receive said reflected energy and located relative to said transmitting means to directly receive radiated energy therefrom, frequency converter means connected between said transmitting means and said mixer for supplying to said mixer a local oscillator signal at a predetermined intermediate-frequency difference from said base frequency, intermediate-frequency amplifier means coupled to said mixer for receiving therefrom and amplifying a first intermediate-frequency output signal of a reference frequency equal to said predetermined difference between the base signal frequency and the local oscillator signal frequency and a further intermediate-frequency output signal of frequency shifted from said reference frequency in a sense and to an extent dependent upon the rate of change of distance of said distant object, and means connected to said amplifier means comparing the frequency of said further output signal with said reference signal frequency for providing an unambiguous measure of the rate of change of distance of said distant object.

15. Apparatus for producing an output signal with a frequency of a very small predetermined difference from the frequency of a base signal, comprising a first frequency converter for receiving said base signals and producing an intermediate signal of frequency different from said base signal frequency by an extent of greater order of magnitude than said small predetermined difference and of lesser order of magnitude than said base signal frequency, and a second frequency converter connected to said first converter to receive said intermediate signal and to provide a frequency conversion of the order of magnitude of the frequency conversion in said first frequency converter and in the opposite sense, the difference of extents of the first and second frequency conversions being equal to said predetermined difference, said first frequency converter comprising a first velocity modulation device having an output resonator, means for supplying said first velocity modulation device with a signal at said base frequency, means for modulating said first velocity modulation device at a first modulation frequency of a greater order of magnitude than said predetermined frequency difference to produce modulation sideband frequency components above and below said base signal frequency, said output resonator being tuned to a selected one of said side-band frequency components, said output resonator selecting said desired frequency conversion component and rejecting components different therefrom by the order of magnitude of said frequency conversion, and said second frequency converter comprising a second velocity modulation device having an output resonator tuned to said output signal frequency, said second device being coupled to the output resonator of said first velocity modulation device to receive therefrom said selected side-band frequency component, and means for modulating said second velocity modulation device at a frequency so related to said first modulation frequency as to produce a modulation side-band frequency component at said output frequency.

16. Apparatus for indicating the speed of a remote object comprising phase-shifting means, means including a directive transmitter and a directive receiver for coupling two alternating signals having different frequencies to said phase-shifting means, said phase shifting means for differentially phase-shifting one of said signals relative to the other in sense and to an extent dependent upon the relative frequencies of said signals, detector means coupled to said phase-shifting means for producing output voltages of a frequency equal to the difference between the frequencies of said two signals and of relative phase dependent upon the differential phase-shift of said two signals, and means coupled to said detector means for indicating the extent and sense of said separation of said output voltages.

17. In object speed determining apparatus, a directive transmitter for irradiating a moving object disposed in space, said transmitter having a signal with a base frequency, a directive receiver located to receive said base frequency signal and a Doppler shifted frequency signal, the frequency difference between said base and said Doppler shifted frequency signal being dependent upon the velocity of said object, a phase-shifting means responsive to said receiver for receiving first and second signals having frequencies spaced apart by an amount substantially equal to said frequency difference, means for differentially phase-shifting one of said first and second signal frequencies relative to the other in sense and to an extent dependent upon the relative frequencies of said signals, detector means coupled to said phase-shifting means for producing an output voltage having a frequency equal to the difference between the frequencies of said first and second signals and of relative phase dependent upon the differential phase shift of said first and second signals, and means coupled to said detector means for indicating the extent and sense of phase separation of said output voltage.

EDWIN T. JAYNES.

REFERENCES CITED

The following references are of record in the file of this patent:

UNITED STATES PATENTS

| Number | Name | Date |
| --- | --- | --- |
| 1,495,616 | Simpson | May 27, 1924 |
| 1,639,667 | Ranger | Aug. 23, 1927 |
| 1,750,668 | Green | Mar. 18, 1930 |
| 1,945,952 | Nicholson | Feb. 6, 1934 |
| 2,071,113 | Crosby | Feb. 16, 1937 |
| 2,100,394 | Heising | Nov. 30, 1937 |
| 2,134,716 | Gunn | Nov. 1, 1938 |
| 2,147,810 | Alford | Feb. 21, 1939 |
| 2,193,361 | Rice | Mar. 12, 1940 |
| 2,198,113 | Holmes | Apr. 23, 1940 |
| 2,223,224 | Newhouse | Nov. 26, 1940 |
| 2,280,026 | Brown | Apr. 14, 1942 |
| 2,312,919 | Litton | Mar. 2, 1943 |
| 2,406,316 | Blumlein et al. | Aug. 27, 1946 |
| 2,416,155 | Chubb | Feb. 18, 1947 |
| 2,424,796 | Carlson | July 29, 1947 |
| 2,435,615 | Varian | Feb. 10, 1948 |